(12) United States Patent
Yang

(10) Patent No.: US 6,367,927 B2
(45) Date of Patent: Apr. 9, 2002

(54) LENS LOCKING DEVICE FOR EYEWEAR AND EYEWEAR INCORPORATING THE SAME

(75) Inventor: Thomas Yang, Elmhurst, NY (US)

(73) Assignee: Stanley Schleger, New York, NY (US)

( * ) Notice: Subject to any disclaimer, the term of this patent is extended or adjusted under 35 U.S.C. 154(b) by 0 days.

(21) Appl. No.: 09/776,456

(22) Filed: Feb. 2, 2001

Related U.S. Application Data

(60) Provisional application No. 60/181,337, filed on Feb. 9, 2000.

(51) Int. Cl.$^7$ .................................................. G02C 1/04
(52) U.S. Cl. ....................... 351/103; 351/106; 351/124; 351/154
(58) Field of Search ........................... 351/41, 44, 103, 351/106, 124, 154

(56) References Cited

U.S. PATENT DOCUMENTS

| | | | |
|---|---|---|---|
| 4,632,526 A | 12/1986 | Lhospice | 351/124 |
| 4,674,851 A | 6/1987 | Jannard | 351/47 |
| 4,951,322 A | 8/1990 | Lin | 2/439 |
| 5,026,150 A | 6/1991 | Weber | 351/47 |
| 5,321,444 A | 6/1994 | Lin | 351/86 |
| 5,428,410 A | 6/1995 | Lei | 351/47 |
| 5,467,148 A | 11/1995 | Conway | 351/85 |
| 5,619,287 A * | 4/1997 | Tseng | 351/44 |
| 5,703,669 A | 12/1997 | Park | 351/86 |
| 5,777,714 A | 7/1998 | Conway | 351/47 |
| 5,796,460 A | 8/1998 | Maturaporn | 351/86 |
| 5,900,922 A * | 5/1999 | Moore | 351/103 |
| 5,903,331 A | 5/1999 | Lin | 351/105 |
| 6,280,030 B1 * | 8/2001 | Chen | 351/86 |

* cited by examiner

Primary Examiner—Huy Mai
(74) Attorney, Agent, or Firm—Ostrolenk, Faber, Gerb & Soffen, LLP

(57) ABSTRACT

A device for holding a lens of eyewear to an eyewear frame comprising: a first fastening portion disposed at approximately a mid point of a bridge bar of the eyewear frame and being disposed only near the midpoint, the first fastening portion having an attachment point for removably fastening the lens; a second fastening portion for removably fastening the lens disposed opposite the first fastening portion and being formed on a nose support of the eyewear; whereby a lens can be attached to the first and second fastening portions to removably secure the lens to the eyewear, there being no other attachment point for the lens to the eyewear frame.

15 Claims, 2 Drawing Sheets

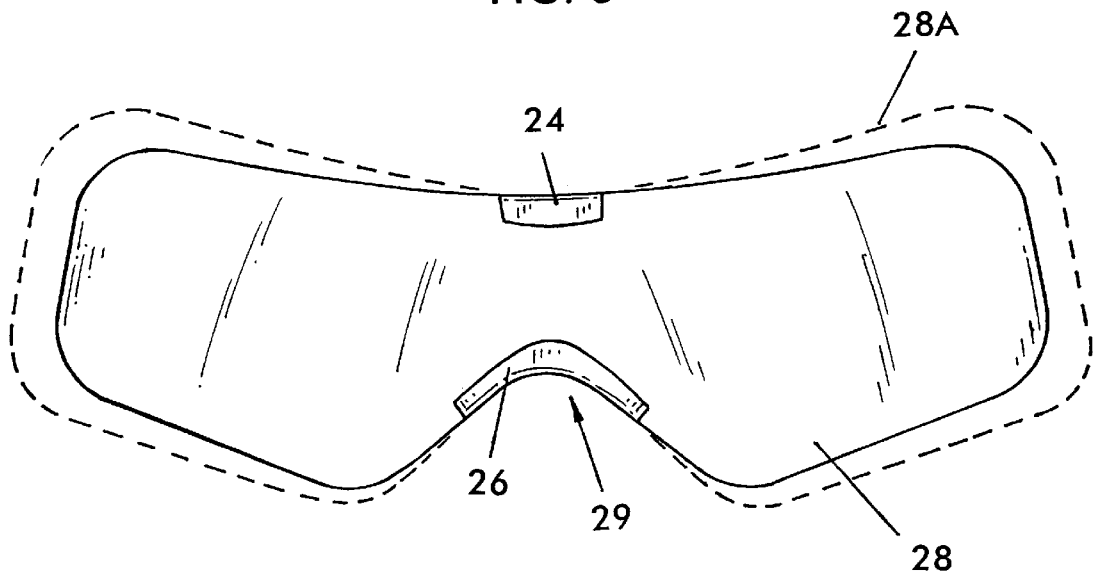
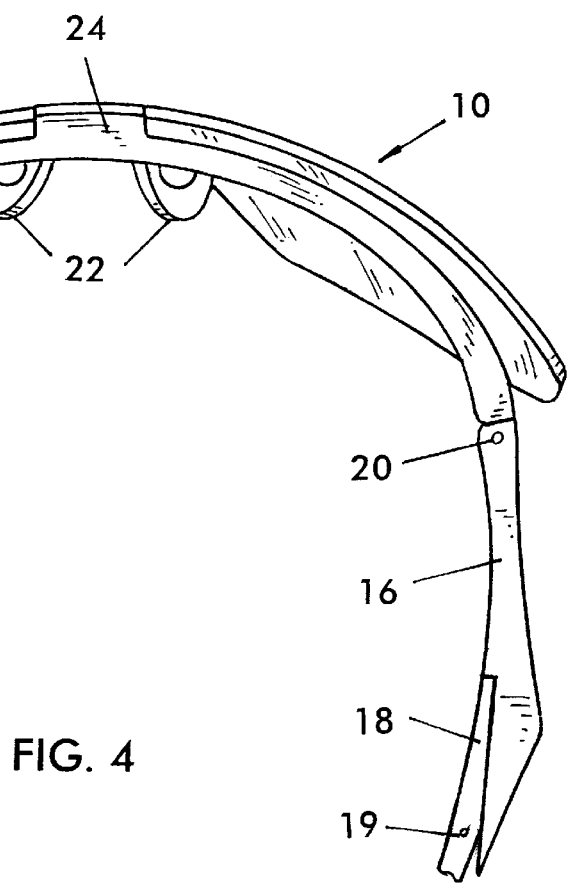

LENS LOCKING DEVICE FOR EYEWEAR AND EYEWEAR INCORPORATING THE SAME

CROSS-REFERENCE TO THE RELATED APPLICATION

The present application claims the benefit and priority of U.S. Provisional patent application 60/181,337 filed Feb. 9, 2000 and entiltled "Lens Locking Device", the disclosure of which is incorporated by reference in its entirety herein.

BACKGROUND OF THE INVENTION

The present invention relates to eyewear and in particular to a lens locking device for eyewear.

Various forms of eyewear are well known. The prior art fails to provide a simple technique for locking removable lenses in position on an eyewear frame so that lenses can be conveniently changed. Further, the prior art does not provide a simple technique for locking a lens of eyewear in position using a minimal number of attachment points and so as to avoid distortion of the lens.

The prior art fails to provide a convenient and simple means for allowing a wearer of eyewear to select among various lenses for use with the eyewear, which holds the lens in position conveniently and allows the lens to be affixed in a simple manner.

U.S. Pat. No. 5,703,669 to Park shows a lens locked in position between a bridge bar and a nose support of the eyewear. However, the lens is located in a long channel which extends for substantially the entire length of the bridge bar. This creates difficulties in fastening the lens and in manufacturing.

U.S. Pat. No. 4,632,526 to Lhospice shows a single attachment of the lens from above the nose support portion at the bridge bar. However, in this design the nose support portion itself is attached to the lens unit, making the lens unit itself more complex and thus interfering with easy interchangeability of lenses.

U.S. Pat. No. 5,026,150 to Weber shows spectacles which attach above the nose support portion to the bridge bar and also to lower portions of the frame at a plurality of locations. Accordingly, this reference discloses a device which is complex and interferes with easy lens attachment and interchangeability.

U.S. Pat. No. 5,428,410 to Lei shows a lens which is received in a channel similar to the Park reference and the nose piece is also attached to the lens, thus suffering from the same disadvantages as the references discussed above.

Other references include the following U.S. Pat. Nos. 5,321,444 Lin, 5,903,331 Lin, 4,674,851 Jannard, 4,951,322 Lin, 5,467,148 Conway, 5,796,460 Maturaporn and 5,777,714 Conway.

None of the prior art, however, shows a simple arrangement for providing a quick and convenient way for attaching an eyewear lens to a frame of the eyewear and which also facilitates interchangeability and removability of lenses that attach to the eyewear.

SUMMARY OF THE INVENTION

Accordingly, it is an object of the present invention to provide a lens locking device which allows a lens to be easily, conveniently and removably attached to a frame of eyewear.

Further, it is an object of the present invention to facilitate the attachment of various interchangeable lenses to eyewear in a simple fashion.

The above and other objects of the present invention are achieved by a device for holding a lens of eyewear to an eyewear frame comprising: a first fastening portion disposed at approximately a mid point of a bridge bar of the eyewear frame and being disposed only near the midpoint, the first fastening portion having an attachment point for removably fastening the lens, a second fastening portion for removably fastening the lens disposed opposite the first fastening portion and being formed on a nose support of the eyewear, whereby a lens can be removably attached to the first and second fastening portions to removably secure the lens to the eyewear, there being no other attachment point for the lens to the eyewear frame.

The objects of the invention are also achieved by an eyewear frame comprising a bridge bar and two temple portions; the bridge bar having a first fastening portion disposed at approximately a midpoint of the bridge bar and being disposed only near the midpoint, the first fastening portion having an attachment point for removably fastening the lens, a nose support attached to the bridge bar, the nose support having at a bottom portion thereof a second fastening portion for removably fastening the lens, the second fastening portion being disposed opposite the first fastening portion; and a lens for removably attaching to the first and second fastening portions, the lens being attached to the eyewear frame by only the first and second fastening portions.

Other objects and advantages of the present invention will be apparent from the following detailed description.

BRIEF DESCRIPTION OF THE DRAWING(S)

The invention will now be described in greater detail in the following detailed description with reference to the drawings in which:

FIG. 3 is a front view of eyewear showing a lens held by the lens locking device of the present invention; and FIG. 4 is a top view of eyewear incorporating the lens locking device of the present invention.

DETAILED DESCRIPTION OF EMBODIMENTS OF THE INVENTION

Figure 1:
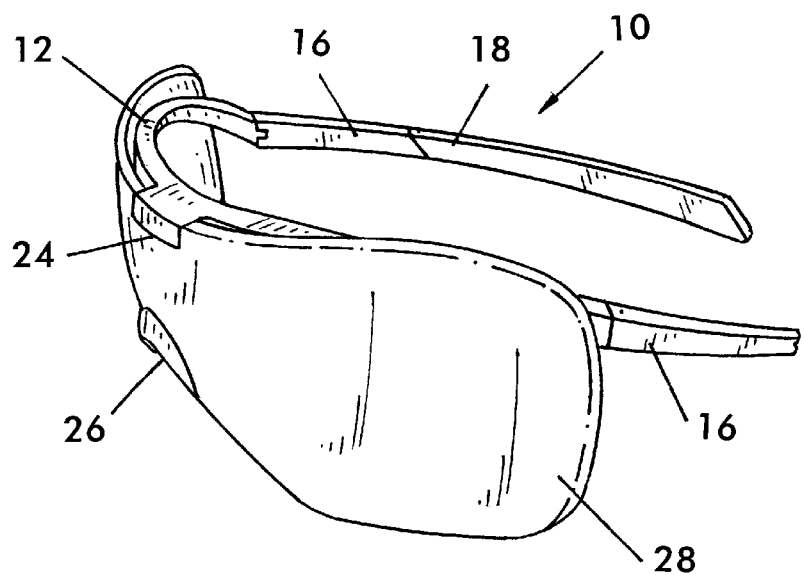
FIG. 1 is a front perspective view of eyewear incorporating the lens locking device of the present invention.
Figure 2:
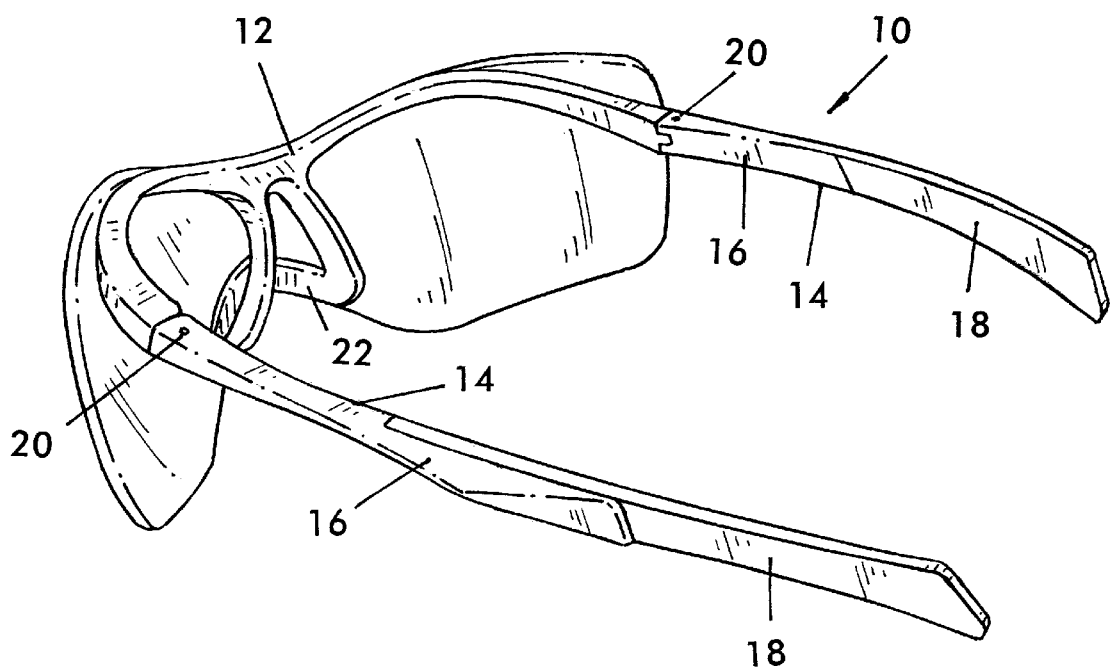
FIG. 2 is a rear perspective view of eyewear incorporating the lens locking device of the present invention.

With reference now to the drawings, the figures generally show eyewear incorporating the lens locking device of the present invention. The eyewear is generally indicated by reference numeral 10. The eyewear incorporates a frame comprising a bridge bar 12 and two temple bars 14. The temple bars 14 may be made so that they are collapsible or foldable. As shown, each of the temple bars 14 comprises a front temple bar portion 16 and a rear temple bar portion 18 connected by a hinge 19. See FIG. 4. However, the temple bars may be one piece temples as is conventional. The temple bars 14 are coupled to the bridge bar 12 at hinges 20 in conventional fashion. The bridge bar 12 has a nose support portion 22 attached thereto. As shown, the nose support portion 22 provides a place for the eyewear to be supported upon the nose of the wearer. The nose support portion 22 may be formed integrally with the bridge bar 12. However, it need not be formed in this way and may be a separate attachable portion attached to the bridge bar 12.

The eyewear according to the invention comprises a first fastening portion, illustratively, a first channel portion 24 located at approximately the center of the bridge bar with the channel facing downwardly. See FIG. 1. The nose support 22 includes a second fastening portion, illustratively a second channel portion 26 having its channel facing upwardly. The channel portions 24 and 26 are designed to receive a lens 28 therebetween, preferably a single piece lens. The lens 28 is snap fitted between the two channel portions 24 and 26. The arcuate shape of the second, lower channel portion and the corresponding nose notch 29 in the lens 28, maintains the lens 28 in its centered position with respect to the frame of the eyewear. The channels of the two channel portions have a width sized to receive the lens 28 therein, so preferably, they have a width no smaller than the thickness of the lens 28.

Further, the first and second fastening portions 24 and 26 are shown as channels. However, other suitable fastening means can be employed which allow for removably fastening lenses to the eyewear. For example, various snap fasteners, hook and loop fasteners (like velcro), threaded fasteners, etc. could be employed.

Furthermore, either or both the lens and the eyewear frame are made flexible to facilitate the snap in fastening of the lens to the first and second fastening portions. If the lens is flexible, the eyewear frame need not be flexible. If the lens is rigid, the frame can be made flexible. Alternatively, both the frame and lens can be made flexible.

The fastening portion 24 is arranged substantially only near or about the center of the bridge bar, e.g., the channel portion 24 only extends a short distance along the bridge bar 12 adjacent the center of the bridge bar.

According to the invention, various interchangeable lenses may be attached to the eyewear by the fastening portions 24 and 26 according to the user's preference. Accordingly, a variety of lens styles including lenses of different colors, having different sun and/or ultraviolet blocking characteristics and of different shapes and/or curvatures, etc., may be conveniently attached to the fastening portions 24 and 26 as the user prefers.

According to the invention, the removable lens 28 is held from near the center of the eyewear only which means the shape and size of the lens can be controlled. A large portion of the edge of the lens 28 does not interfere with the frame 12, thus maintaining the original shape of the lens and preventing distortion of the lens. Further, attachment is simple. The lens is easily fastened between the portions 24 and 26 to secure it and easily removed. In the embodiment shown, the lens and/or eyewear frame is flexed slightly to secure it in the channels. Similarly, slight flexing will allow the lens to be removed.

FIG. 3 shows a lens 28 and one example of another lens 28A shown in dotted lines illustrating how differently shaped lenses may be fitted between the portions 24 and 26.

As shown in FIG. 4, the frame 12 does not interfere with the lens and the lens keeps its shape despite movement of the frame.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A device for holding a lens of eyewear to an eyewear frame comprising:
    a first fastening portion disposed at approximately a mid point of a bridge bar of the eyewear frame and being disposed only near the midpoint, the first fastening portion having an attachment point for removably fastening the lens;
    a second fastening portion for removably fastening the lens disposed opposite the first fastening portion and being formed on a nose support of the eyewear;
    whereby a lens can be attached to the first and second fastening portions to removably secure the lens to the eyewear, there being no other attachment point for the lens to the eyewear frame.

2. The device of claim 1, wherein at least one of the first and second fastening portions comprise a channel portion, the lens being received in an open channel of the at least one first and second fastening portions.

3. The device of claim 2, wherein the first and second fastening portions comprise first and second channel portions, respectively, the first channel portion having a downwardly directed open channel when the eyewear is worn for removably receiving the lens and the second channel portion having an upwardly directed open channel for removably receiving the lens opposed to the open channel of the first channel portion, the lens being removably received between the two open channels.

4. The device of claim 1, wherein at least one of the lens and eyewear frame is flexible to facilitate fastening to the first and second fastening portions.

5. The device of claim 1, wherein the second fastening portion is part of a nose support which is integrally molded to the frame of the eyewear.

6. The device of claim 1, further comprising at least one attachable and removable lens for securement between the first and second fastening portions.

7. The device of claim 1, wherein the lens comprises a single piece lens.

8. The device of claim 1, further comprising a kit comprising a plurality of attachable and removable lenses for securement to the first and second fastening portions.

9. Eyewear comprising an eyewear frame comprising a bridge bar and two temple portions; the bridge bar having a first fastening portion disposed at approximately a midpoint of the bridge bar and being disposed only near the midpoint, the first fastening portion having an attachment point for removably fastening the lens;
    a nose support attached to the bridge bar, the nose support having at a bottom portion thereof a second fastening portion for removably fastening the lens disposed opposite the first fastening portion; and
    a lens for removably attaching to the first and second fastening portions, the lens being attached to the bridge bar by only the first and second fastening portions.

10. The eyewear of claim 9, wherein at least one of the first and second fastening portions comprise a channel portion, the lens being received in an open channel of the at least one first and second fastening portions.

11. The eyewear of claim 10, wherein the first and second fastening portions comprise first and second channel portions, respectively, the first channel portion having a downwardly directed open channel when the eyewear is worn for removably receiving the lens and the second channel portion having an upwardly directed open channel for removably receiving the lens opposed to the open channel of the first channel portion, the lens being removably received between the two open channels.

12. The eyewear of claim 9, wherein at least one of the lens and eyewear frame is flexible to facilitate fastening to the first and second fastening portions.

13. The eyewear of claim 9, wherein the nose support is integrally molded to the bridge bar.

14. The eyeware of claim 9, wherein the lens comprises one of a plurality of attachable and removable lenses for securement to the first and second fastening portions.

15. The eyewear of claim 9, wherein the lens comprises a single piece lens.

* * * * *